United States Patent
Greiner et al.

(10) Patent No.: US 6,790,882 B2
(45) Date of Patent: Sep. 14, 2004

(54) MACHINE ELEMENTS CONSISTING OF A GLASS/PLASTIC COMPOUND

(75) Inventors: Robert Greiner, Baiersdorf (DE); Heinrich Kapitza, Fuerth (DE); Manfred Ochsenkuehn, Berg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/240,551

(22) PCT Filed: Apr. 5, 2001

(86) PCT No.: PCT/DE01/01336

§ 371 (c)(1),
(2), (4) Date: Oct. 2, 2002

(87) PCT Pub. No.: WO01/77038

PCT Pub. Date: Oct. 18, 2001

(65) Prior Publication Data

US 2003/0105200 A1 Jun. 5, 2003

(30) Foreign Application Priority Data

Apr. 6, 2000 (DE) .......................... 100 17 136

(51) Int. Cl.⁷ ............................ C08K 7/20; C08K 3/40
(52) U.S. Cl. ..................... 523/223; 524/403; 524/414
(58) Field of Search ............... 523/223; 524/403, 524/414; 501/42, 43, 44, 45, 46, 47, 48

(56) References Cited

U.S. PATENT DOCUMENTS

| | | | |
|---|---|---|---|
| 3,732,181 A | * | 5/1973 | Ray et al. .............. 523/207 |
| 4,285,730 A | * | 8/1981 | Sanford et al. .............. 501/44 |
| 5,043,369 A | * | 8/1991 | Bahn et al. .............. 523/466 |
| 5,328,874 A | | 7/1994 | Beall et all. |
| 5,507,990 A | * | 4/1996 | Bookbinder et al. ........ 264/143 |

FOREIGN PATENT DOCUMENTS

| | | |
|---|---|---|
| DE | 199 60 549 | 6/2001 |
| EP | 0 365 236 | 4/1990 |
| EP | 0 773 196 | 5/1997 |
| WO | 01/44361 A1 | 6/2001 |

OTHER PUBLICATIONS

PAJ translation of JP10–101364 (Apr. 21, 1998), Usui Hiroshi et al.*

USPTO translation 03–4008, of DE 19960549 (Jun. 21, 2001) Greiner et al.*

Gunter Erhard et al., "Maschinenelemente aus thermoplastischen Kunststoffen, Lager und Antriebselemente," 2. Auflage, VDI–Verlag GmbH, 1983, pp. 5–9.

PAJ, abstract of JP10/101364 (Apr. 21, 1998), Tomiya, S.

* cited by examiner

*Primary Examiner*—Matthew A. Thexton
(74) *Attorney, Agent, or Firm*—Young & Thompson

(57) ABSTRACT

Machine elements such as bearings and toothed wheels, which consist of a thermoplastic-based glass/plastic compound containing a sulfophosphate glass with a low melting point and with the following composition: 4 to 10% $Li_2O$, 4 to 10% $Na_2O$, 4 to 8% $K_2O$, 1 to 2% CaO, 35 to 37% ZnO, 0 to 3% $La_2O_3$, 19 to 22% $P_2O_5$ and 19 to 22% $SO_3$; and a high performance thermoplastic.

8 Claims, No Drawings

MACHINE ELEMENTS CONSISTING OF A GLASS/PLASTIC COMPOUND

CROSS REFERENCE TO RELATED APPLICATIONS

This is the 35 USC 371 national stage of international application PCT/DE01/01336 filed on Apr. 5, 2001, which designated the United States of America.

FIELD OF THE INVENTION

The invention relates to machine elements, such as bearings and gears.

BACKGROUND OF THE INVENTION

A range of plastics are used as material for machine elements. In addition to good mechanical properties, such as good rigidity and toughness, materials of this type are required above all to have good tribological properties and a good to very good chemicals resistance. Moreover, the materials have to prove themselves under hard conditions and are often exposed to long-term use temperatures of over 140° C.

The group of plastics which are used for machine elements under demanding conditions includes thermosets, such as epoxy resins, phenol formaldehyde resins and polyimide resins, and high-temperature thermoplastics, such as polyphenylene sulfide, polyether ether ketone, polyetherimide, polyethersulfone, polysulfone and liquid-crystal polymers, and also industrial thermoplastics, such as polyamide and polyoxymethylene. However, in the case of the latter class of materials, the range of applications is limited with regard to the maximum temperature: $T_{max}<125°$ C. The high-temperature thermoplastics used in machine elements are predominantly reinforced with glass or carbon fibers or mixed with mineral fillers, but are also used in unreinforced or unfilled form. Especially for bearings applications, these thermoplastics are often also modified with graphite, molybdenum disulfide or polytetrafluoroethylene in order to improve the tribological properties (cf. in this respect Gunter Erhard and Erich Strickle, "Maschinenelemente aus thermoplastischen Kunststoffen—Lager und Antriebselemente" [Machine elements made from thermoplastics—bearings and drive elements], 2nd Edition, VDI-Verlag GmbH, Düsseldorf 1985, pp. 7 to 9).

Compared to metallic materials, unreinforced or unfilled thermoplastics have a thermal expansion which is approximately 10 times greater, generally a lower strength and correspondingly a low load-bearing capacity and a lower modulus of elasticity and a limited high-temperature dimensional stability. Therefore, corresponding machine elements can only be used at relatively low temperatures and under relatively low loads. The profile of properties can be improved by the addition of reinforcing agents and fillers.

When used in machine elements, in addition to the rigidity the flow properties and the resistance to abrasion and also the dimensional stability of the materials play a crucial role. However, particle contamination has proven to be a problem with all materials, for example for the production of bearings and gears, as have the abrasion characteristics in operation. Furthermore, when the machine elements are produced by injection molding, glass fibers are in some cases forced to the component surface or project out of the latter. During subsequent working and/or assembly steps, the protruding glass fibers then break off and may be deposited on the surface of the machine elements, in which case they intensify the friction and wear. Furthermore, the orientation and position of the fibers with respect to the direction of load and movement are crucial to the tribological characteristics especially in the case of bearings. An optimum abrasion and wear resistance is only achieved when the fibers lie parallel to the direction of load and movement. However, particularly in the case of complicated components, this cannot be ensured and areas in which the fibers lie perpendicular to the direction of load and movement are formed; the result is a much worse tribological behavior. Furthermore, the introduction of fibers results in a strongly anisotropic behavior in the material during processing, and this manifests itself during the production of components and samples in different shrinkage characteristics and—as a corollary—in distortion of the parts. The reason for this is the orientation of the fibers during the filling operation. Specifically, the fibers are oriented in the direction of flow of the molten material, with the result that, in the finished part, the shrinkage is considerably reduced in the direction of the fibers compared to the direction which is transverse to the fibers. To moderate this anisotropic characteristic, fiber/mineral mixtures are often used as a reinforcing system. The thermoplastics often also have to be processed into composite elements, in which the plastic parts are combined, for example, with a steel shell or a steel ring for support. The plastic surface then has to be remachined and lubricated at considerable cost.

SUMMARY OF THE INVENTION

It is an object of the invention to design machine elements in such a manner that they are stable and capable of withstanding high loads, the materials used for these elements having favorable tribological properties and good dimensional stability.

According to the invention, this is achieved by the fact that the machine elements consist of a thermoplastic-based glass/plastic compound which contains a low-melting sulfophosphate glass of the following composition (in mol %): 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic.

The use of the special glass/plastic compound comprising a low-melting sulfophosphate glass and a high-performance thermoplastic results in machine elements which have a long service life, in particular at elevated temperatures. Moreover, the novel materials have good mechanical properties, such as a high rigidity, dimensional stability and ability to withstand compressive loads. Therefore, the corresponding machine elements also no longer have to be supported with complex metal inlays. A "low-melting" sulfophosphate glass is understood as meaning a glass with a low glass transition temperature $T_g$, in particular a glass with $T_{g\ <approx.}$ 500° C. A "high-performance thermoplastic" is a high-performance polymer, specifically, in the present instance, a heat-resistant polymer (high-temperature resistant polymer). This is important because both the temperature at which the compound is produced and the processing temperature (of the compound) are >300° C.

The sulfophosphate glass which is contained in the glass/plastic compound has a glass transition temperature in the range from 250 to 280° C.; therefore, at the processing temperature it is in the free-flowing state. The compound preferably includes a sulfophosphate glass of the following composition (in mol %): 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$. A glass of this type has a glass transition temperature of 268° C. Another glass has, by way of example, the following composition (in mol %): 9% of $Li_2O$, 5% of $Na_2O$, 7% of $K_2O$, 1.6% of CaO, 37% of ZnO, 20.4% of $P_2O_5$ and 20% of $SO_3$ ($T_g$=280°C.). By way of example, a further glass has the following composition (in mol %): 4.8% of $Li_2O$, 9.2% of $Na_2O$, 6.9% of $K_2O$, 1.6% of CaO, 35.9% of ZnO, 2.0% of $La_2O_3$, 19.6% of $P_2O_5$ and 20.0% of $SO_3$ ($T_g$ =275° C.).

As high-performance thermoplastic, the glass/plastic compound preferably contains one of the following polymers: a polyether ether ketone (PEEK), a polyetherimide (PEI), a polyphenylene sulfide (PPS), a partially aromatic polyamide, such as polypthalamide (PPA) and polyamide (PA) 6/6T, or a liquid-crystal polymer (LCP). In these polymers, the glass transition temperature of the glass component is matched to the processing temperature of the thermoplastic material.

Further high-performance thermoplastics which can be used are polyaryl ether ketones (PAEK) in general, for example polyether ketones (PEK), and polysulfones (PSU), in particular polyethersulfones (PES) and polyphenylene sulfones (PPSU).

The proportion of the glass component, i.e. the sulfophosphate glass, in the compound is generally 15 to 80% by weight, preferably 25 to 60% by weight. The processing temperature of the compound is approximately 320 to 420° C. Despite the high proportion of glass, the compound has a high ability to flow or very good flow properties.

The glass/plastic compound is advantageously produced, for example, by first of all producing a masterbatch with a glass content of 60 to 90% by weight—at elevated temperature (preferably approximately 320 to 420° C.)—from the two components, i.e. sulfophosphate glass and high-performance thermoplastic. Surprisingly, it has been found that, when glass particles (glass grains) with a diameter of ≦1.5 mm are used in the masterbatch, glass structures in the μm and sub-μm range are obtained, with a uniform distribution.

The further processing then takes place in such a manner that, a result of the addition of further high-performance thermoplastic to the masterbatch—at elevated temperature (preferably approximately 320 to 420° C.)—the glass content is reduced, for example, to 25 to 60% by weight. The structure and homogenous distribution of the glass particles are not affected, i.e. are retained. Surprisingly, control experiments have shown that the structure size and distribution of the type described are not obtained if the process proceeds directly from a batch with a glass content of, for example, 15%. Rather, uniformly distributed glass structures, even in the nm range, can only be achieved starting from a masterbatch with a high proportion of the special sulfophosphate glass in a high-performance thermoplastic. As has already been stated, the compound is in the free-flowing state at the processing temperature. The melting process which takes place during the processing means that a new, virgin glass surface is always produced. Therefore, a very smooth surface is obtained and the bonding of the glass particles to the plastic matrix is very good. Compared to conventional fiber-reinforced compounds, there are no exposed glass fibers or glass-fiber ends, and the formation of particles through abrasion is drastically reduced.

Machine elements made from the novel materials, which have good tribological and good shrinkage properties, are in particular bearings, such as sliding-contact bearings, and gears. Examples of further possible uses for these materials are rolls, pulleys, couplings, joints, hinges and spring elements.

DETAILED DESCRIPTION OF THE INVENTION

The invention is to be explained in even more detail with reference to exemplary embodiments. The sulfophosphate glass used in the tests has the following composition (in mol %): 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

EXAMPLE 1

Friction and Wear

The friction and wear characteristics are tested in a pin/wheel arrangement.

| Test parameters: | |
| --- | --- |
| Friction wheel: | steel |
| Surface roughness of the friction wheel; | 0.8 μm |
| Surface pressure: | 4 N/mm² |
| Friction speed: | 0.5 m/s |
| Temperature: | 23° C. |

The wear (in μm) and coefficient of friction are determined on injection-molded specimens (basic surface area: 10 mm × 4 mm) which were taken from a dumbbell specimen. After the run-in phase has ended, the test duration is 15 h. A compound based on PPS with a glass content of 60% by weight is compared with a commercially available PPS with 40% by weight of glass fibers (PPS Gf 40).

| Material | Wear in 15 h μm | Coefficient of friction |
| --- | --- | --- |
| PPS Gf 40 | 950 | 0.32 |
| PPS + 60% glass | 20 | 0.30 |

EXAMPLE 2

Dimensional Stability and Shrinkage

The shrinkage characteristics are measured on injection-molded plates longitudinally and transversely with respect to the direction of flow:

a) Mold shrinkage: 24 h after molding (storage: 23° C., 50% relative humidity);

b) Post-shrinkage: after subsequent storage at 180° C. (2 h).

| Process parameters: | |
| --- | --- |
| Plate size: | 130 mm × 100 mm |
| Plate thickness: | 1 mm |
| Compound temperature: | 330° C. |
| Mold temperature: | 150° C. |
| Molding pressure: | 700 bar |

A compound based on PPS with a glass content of 40% by weight and a corresponding compound with a glass content of 60% by weight are compared with a commercially available PPS with a 40% by weightGlass fiber content (PPS Gf 40) and a commercially available PPS with 65% by weight glass fiber/mineral content (PPS Gf/M 65, optimized for low distortion).

| Material | Mold shrinkage in %<br>longitudinal/transverse | Post-shrinkage in %<br>longitudinal/transverse |
| --- | --- | --- |
| PPS + 40% glass | <0.5/<0.6 | <0.4/<0.4 |
| PPS + 60% glass | <0.4/<0.5 | <0.2/<0.3 |
| PPS Gf 40 | <0.85/<0.2 | |
| PPS Gf/M 65 | <0.7/<0.2 | |

What is claimed is:

1. Machine elements, characterized in that they consist of a thermoplastic-based glass/plastic compound which contains a low-melting sulfophosphate glass of the following composition: in mol %: 4 to 10% of $Li_2O$, 4 to 10% of $Na_2O$, 4 to 8% of $K_2O$, 1 to 2% of CaO, 35 to 37% of ZnO, 0 to 3% of $La_2O_3$, 19 to 22% of $P_2O_5$ and 19 to 22% of $SO_3$, and a high-performance thermoplastic.

2. The machine elements as claimed in claim 1, characterized in that the compound contains a sulfophosphate glass of the following composition: 4.9% of $Li_2O$, 9.4% of $Na_2O$, 7.1% of $K_2O$, 1.6% of CaO, 36.6% of ZnO, 20.0% of $P_2O_5$ and 20.4% of $SO_3$.

3. The machine elements as claimed in claim 1 characterized in that the compound contains, as high-performance thermoplastic, a polyether ether ketone, a polyetherimide, a polyphenylene sulfide, a partially aromatic polyamide or a liquid-crystal polymer.

4. The machine elements as claimed in one of claims 1 characterized in that the proportion of sulfophosphate glass in the compound is 15 to 80% by weight, preferably 25 to 60% by weight.

5. The machine elements as claimed in claim 2, characterized in that the compound contains, as high-performance thermoplastic, a polyether ether ketone, a polyetherimide, a polyphenylene sulfide, a partially aromatic polyamide or a liquid-crystal polymer.

6. The machine elements as claimed in claim 2, characterized in that the proportion of sulfophosphate glass in the compound is 15 to 80% by weight, preferably 25 to 60% by weight.

7. The machine elements as claimed in claim 3, characterized in that the proportion of sulfophosphate glass in the compound is 15 to 80% by weight, preferably 25 to 60% by weight.

8. The machine elements as claimed in claim 5, characterized in that the proportion of sulfophosphate glass in the compound is 15 to 80% by weight, preferably 25 to 60% by weight.

* * * * *